United States Patent
Novellini

(10) Patent No.: US 9,130,807 B1
(45) Date of Patent: Sep. 8, 2015

(54) DATA RECOVERY UNIT (DRU) BASED ON FREE RUNNING OVERSAMPLING WITH ZERO-LATENCY LOOP

(71) Applicant: Xilinx, Inc., San Jose, CA (US)

(72) Inventor: Paolo Novellini, Gorgonzola (IT)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/321,563

(22) Filed: Jul. 1, 2014

(51) Int. Cl.
*H04L 27/22* (2006.01)
*H04L 1/20* (2006.01)

(52) U.S. Cl.
CPC . *H04L 27/22* (2013.01); *H04L 1/20* (2013.01)

(58) Field of Classification Search
CPC .................................. H04L 27/22; H04L 1/20
USPC .................................. 375/324, 354, 371, 376
See application file for complete search history.

(56) References Cited

U.S. PATENT DOCUMENTS

| | | | |
|---|---|---|---|
| 5,815,541 A * | 9/1998 | Fukushi | 375/376 |
| 6,249,160 B1 * | 6/2001 | Tagami et al. | 327/165 |
| 7,737,793 B1 * | 6/2010 | Ying et al. | 331/17 |
| 2005/0213696 A1 * | 9/2005 | Totsuka et al. | 375/376 |

OTHER PUBLICATIONS

Chen, I-Fong et al., "Loop Latency Reduction Technique for All-Digital Clock and Data Recovery Circuits," *IEEE Asian Solid-State Circuits Conference*, Nov. 16, 2009, pp. 1-4, IEEE Press, Piscataway, New Jersey, USA.
Novellini, Paolo et al., *Dynamically Programmable DRU for High-Speed Serial I/O*, XAPP875 (v1.1), Jan. 13, 2010, pp. 1-14, Xilinx, Inc., San Jose, California, USA.

* cited by examiner

*Primary Examiner* — Leon Flores
(74) *Attorney, Agent, or Firm* — Gerald Chan

(57) ABSTRACT

A data recovery unit (DRU) includes: an oscillator; a phase detector unit configured to receive a reference phase and to receive input data through N wires, where N is an integer, to compare the reference phase with the input data to obtain phase errors, and to determine an average of the phase errors; a subtractor to subtract an output of the oscillator from the average of the phase errors to obtain an unbiased phase error; a delay unit to receive the input data; and a sample selector configured to receive an output from the delay unit and the output of the oscillator, and to output recovered data.

20 Claims, 6 Drawing Sheets

DATA RECOVERY UNIT (DRU) BASED ON FREE RUNNING OVERSAMPLING WITH ZERO-LATENCY LOOP

TECHNICAL FIELD

The present disclosure relates to data recovery units (DRUs). In particular, it relates to DRUs based on free running oversampling with zero-latency loop.

BACKGROUND

The circuit depicted in FIG. 1 shows an exemplary fractional, oversampling based data recovery unit (DRU) 100. In this circuit (which receives at least one clock signal (CLK) 105), the phase generated by the digital voltage controlled oscillator (VCO), which is depicted as a numerically controlled oscillator (NCO) 110, is compared by a phase detector unit 120, at each clock cycle, with the phase of oversampled incoming data 130. The incoming data 130 is deserialized over N wires 140, as high speed DRUs typically operate in parallel. The phase error, which is filtered by a variable low pass filter (LPF) 150, is used to correct the frequency of the NCO 110, so that its phase tracks the phase of the incoming data. The sample selector (SS) 160 associates a numerical phase at each raw sample, and extracts the ones that are optimally located in an eye diagram. The SS 160 outputs at least one output data signal (DATAOUT) 190 and at least one enable signal (ENABLE) 195, which indicates which portions of output data signal 190 are the recovered data. The DRU bandwidth may be tuned by controlling the coefficients of the LPF 150.

In the illustrated example, the DRU 100 operates based on a negative feedback loop 180. In particular, the upper bound of the bandwidth at which the DRU 100 can be tuned to is limited by the amount of time (e.g., the processing time (PT) 170) it takes to calculate the control signal for the LPF 150 (e.g., signal "A") from the NCO 110 phase (e.g., signal "C") and the oversampled incoming data phase (e.g., signal "B"). This amount of processing time PT 170 increases as the datapath, which corresponds with the number N of wires, of the DRU 100 becomes wider. As integrated circuit technologies, such as the technology for field programmable gate arrays (FPGAs), continue to improve, DRU may be required to have wider datapath. As an example, it is common today to have a datapath width equal to 80 and above, and a clock frequency for the DRU in the fabric equal to about 150 MHz. In some cases, the PT may be in the range of 10 clock cycles or more. In some cases, the serdes speed and standard protocol speed may be increasing faster than the fabric speed.

Many protocols today, such as the Serial ATA (SATA), DisplayPort, Universal Serial Bus (USB) 3, etc., require a receiver with a wide bandwidth to be able to cope with the wide spread spectrum clock (SSC) level and the high sinusoidal jitter (SJ), which is in the range of few megahertz (MHz). DisplayPort, for example, has a challenging requirement of 2 MHz. Minimizing the PT in order to meet the wide jitter tolerance requirements of these protocols is a challenge today, and it will become more difficult going forward as technology continues to improve.

SUMMARY

A new structure for a DRU having a bandwidth for which the upper bound is not limited by the PT would be advantageous.

The present disclosure relates to a method, system, and apparatus for a data recovery unit (DRU) based on free running oversampling with zero-latency loop. In some cases, the disclosed method for a DRU involves inputting, into a phase detector unit, a reference phase and input data from N wires, where N is an integer. The method further involves comparing, with the phase detector unit, the reference phase with the input data to obtain phase errors. Also, the method involves determining, with the phase detector unit, an average of the phase errors. In addition, the method involves subtracting, with a subtractor, an output of an oscillator from the average of the phase errors to obtain an unbiased phase error. Additionally, the method involves inputting, into the oscillator, the unbiased phase error. Also, the method involves inputting, into a delay unit, the input data. In addition, the method involves inputting, into a sample selector, an output from the delay unit and the output of the oscillator. Further, the method involves outputting, from the sample selector, recovered data.

A data recovery unit (DRU) includes: an oscillator; a phase detector unit configured to receive a reference phase and to receive input data through N wires, where N is an integer, to compare the reference phase with the input data to obtain phase errors, and to determine an average of the phase errors; a subtractor to subtract an output of the oscillator from the average of the phase errors to obtain an unbiased phase error; a delay unit to receive the input data; and a sample selector configured to receive an output from the delay unit and the output of the oscillator, and to output recovered data.

A method performed by a data recovery unit (DRU) includes: receiving, by a phase detector unit, a reference phase and input data, wherein the input data is received by the phase detector unit through N wires, where N is an integer; comparing, using the phase detector unit, the reference phase with the input data to obtain phase errors; determining, using the phase detector unit, an average of the phase errors; subtracting, with a subtractor in the phase detector unit, an output of an oscillator from the average of the phase errors to obtain an unbiased phase error; receiving, by a delay unit in the phase detector unit, the input data; inputting, into a sample selector in the phase detector unit, an output from the delay unit and the output of the oscillator; and outputting, from the sample selector, recovered data.

The features, functions, and advantages can be achieved independently in various examples of the present inventions or may be combined in yet other examples.

Other and further aspects and features will be evident from reading the following detailed description.

BRIEF DESCRIPTION OF THE DRAWINGS

These and other features, aspects, and advantages of the present disclosure will become better understood with regard to the following description, appended claims, and accompanying drawings.

DETAILED DESCRIPTION

Figure 1:
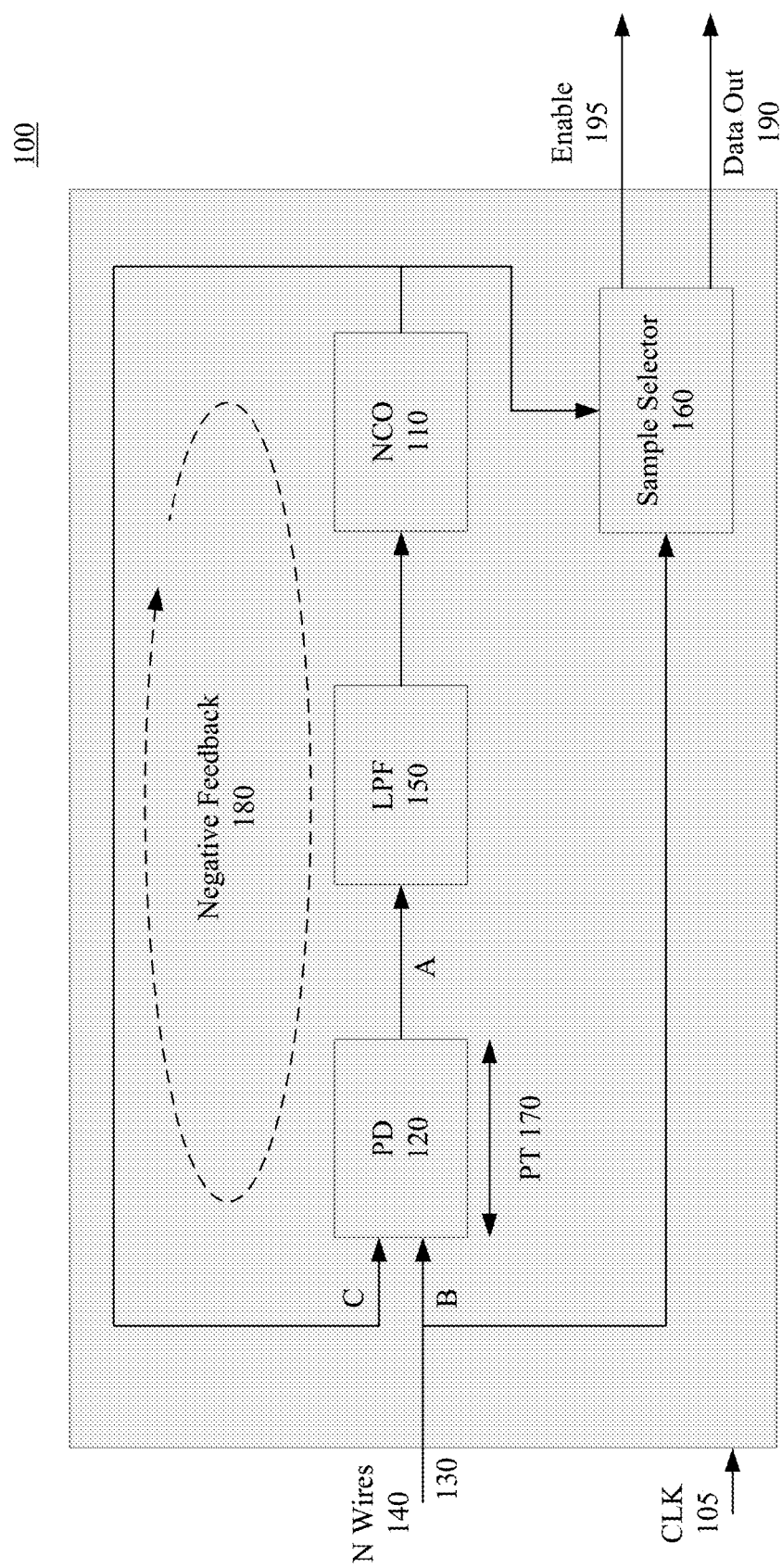
FIG. 1 is a schematic diagram showing an exemplary oversampling based data recovery unit (DRU).

Various examples are described hereinafter with reference to the figures. It should be noted that the figures are not drawn to scale and that the elements of similar structures or functions are represented by like reference numerals throughout the figures. It should be noted that the figures are only intended to facilitate the description of the examples. They are not intended as an exhaustive description of the invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

The methods and apparatus disclosed herein provide an operative system for a data recovery unit (DRU) based on free running oversampling with zero-latency loop. The disclosed system comprises a new structure for a DRU, where the upper bound of its bandwidth is not limited by the processing time (PT) (e.g., where the PT is equal to zero).

As previously mentioned above, the maximum bandwidth at which a given oversampling based DRU can be tuned to is limited by its loop latency (time delay). The loop latency is constrained by the calculations that have to be carried out to define the oscillator control signal at each clock cycle. Having a loop with zero latency allows for tuning the DRU bandwidth to reach its limit (or at least closer to it), which is given by the clock frequency at which the DRU is operated.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 2:
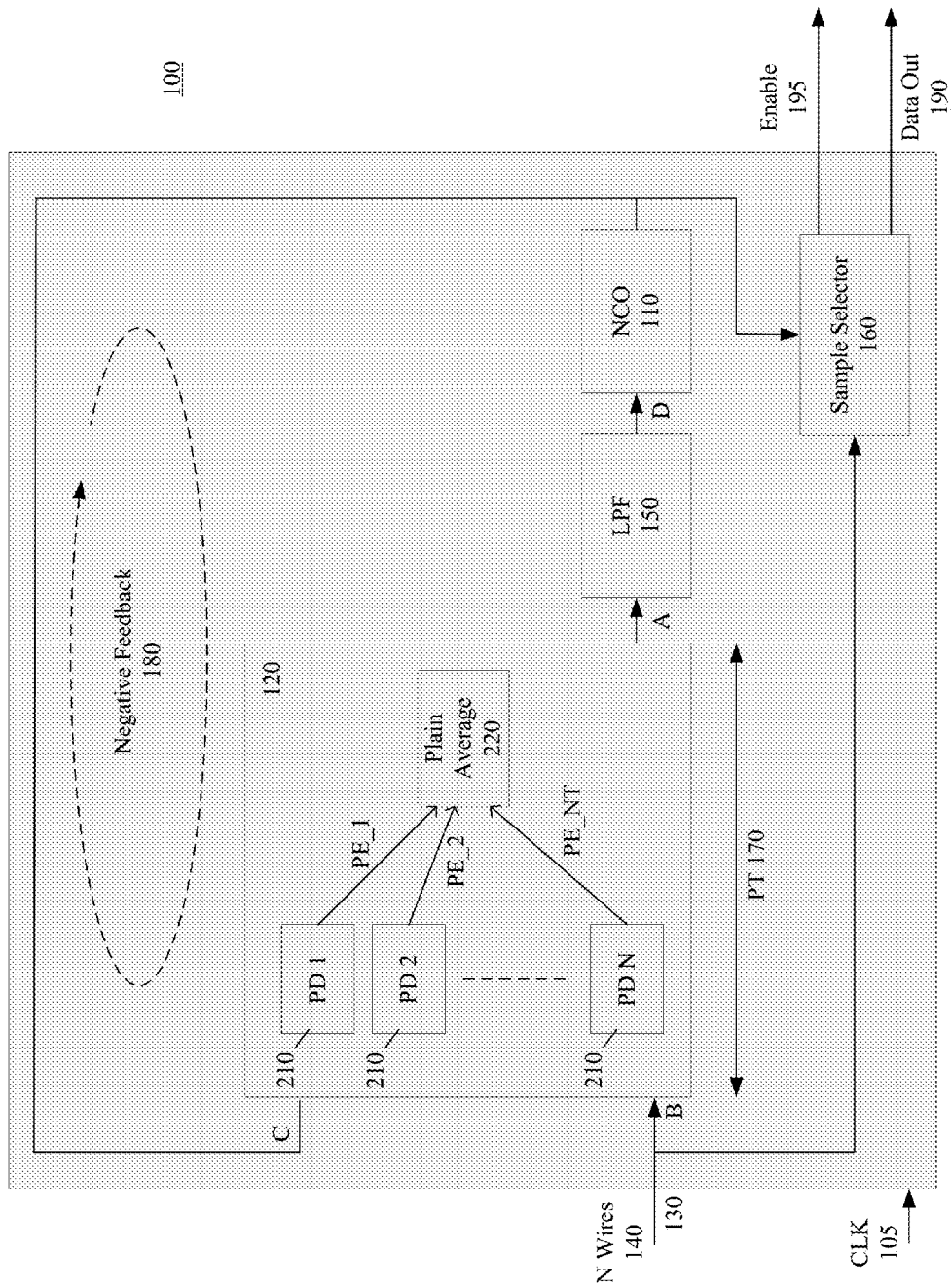
FIG. 2 is a schematic diagram depicting the DRU of FIG. 1 showing an expanded view of the phase detector unit.

FIG. 2 is a schematic diagram depicting a DRU 100 of FIG. 1, particularly showing an expanded view of the phase detector unit 120. In this figure, the phase detector (PD) unit 120 is shown to include N phase detectors (PDs) 210, where N is an integer. The phase detector unit 120 of the DRU 100, which is operating on a wide datapath, has to first locate all of the transitions in the incoming oversampled data 130. With the phase information coming from the NCO 110, a phase error may be associated to each transition. If there are NT transitions in a given clock cycle, where NT is an integer, the phase detector unit 120 will generate NT phase errors (e.g., PE_1 to PE_NT). The phase detector unit 120 will then calculate the average (denoted by block 220) of those NT estimated phase errors. The average of the NT estimated phase errors is the phase error (e.g., signal "A"), which will be injected into the LPF 150. In some cases, each phase error may be 16 bits, and the block 220 that performs the averaging calculation is receiving NT phase errors per clock cycle. The NT phase errors may change at each clock cycle.

The calculations that need to be performed by the phase detector unit 120 require, in general, many clock cycles, and the structure will operate efficiently in pipeline. The processing time (PT) 170 is the amount of time required by the phase detector unit 120 to calculate the average phase error (e.g., signal "A"). It should be noted that the pipeline structure in which the phase detector unit 120 operates is responsible for the loop latency in the DRU 100, and it is the loop latency that limits the DRU 100 performance.

Figure 3:
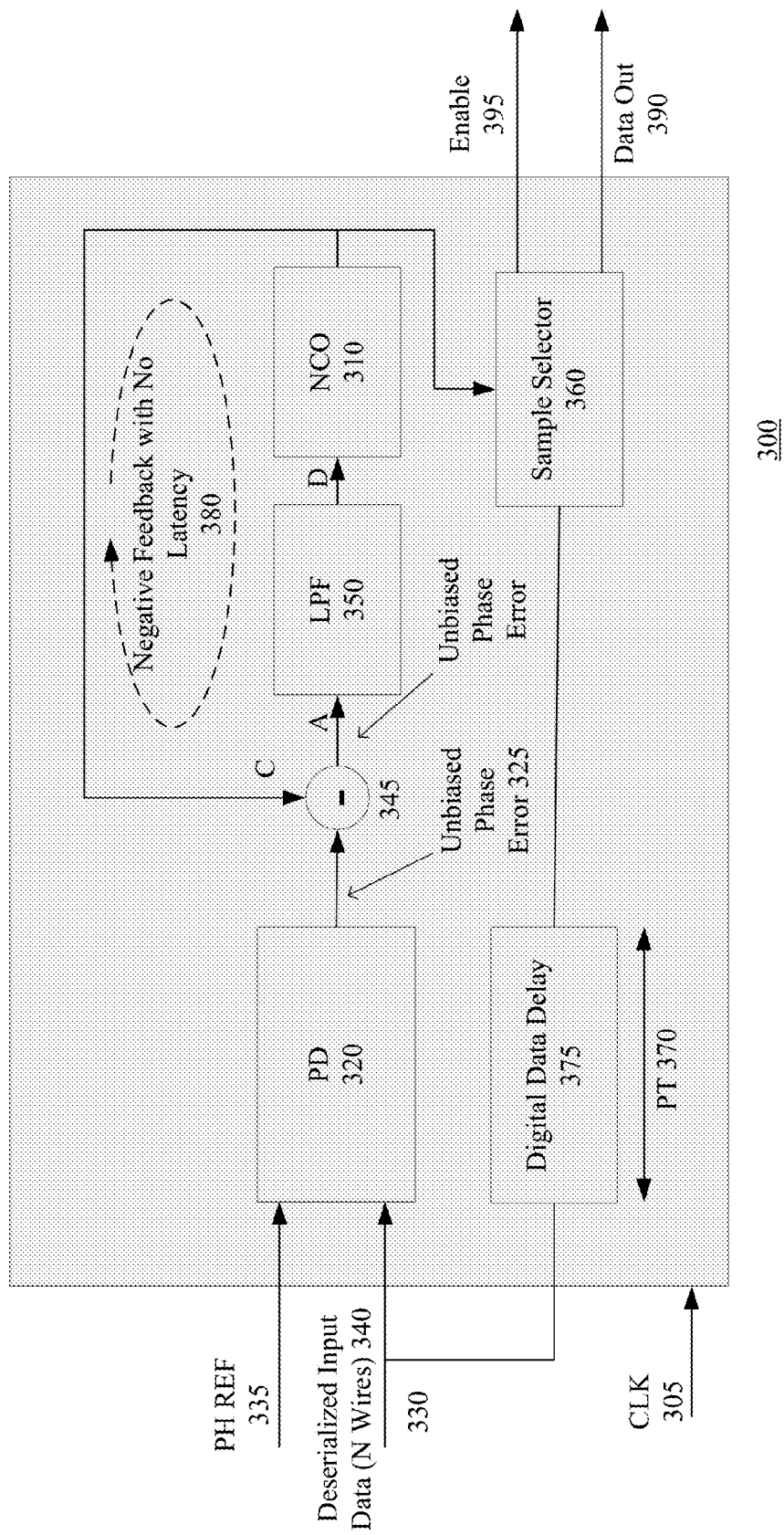
FIG. 3 is a schematic diagram illustrating the disclosed oversampling based DRU with zero-latency loop.

FIG. 3 is a schematic diagram illustrating an oversampling based DRU 300 with zero-latency loop. Similar to the DRU 100 of FIGS. 1 and 2, the DRU 300 of FIG. 3 includes a phase detector unit 320, a LPF 350, an oscillator 310, and a sample selector (ss) 360. In some cases, the oscillator 310 may be a numerically controlled oscillator (NCO). Also, in some cases, the oscillator 310 may be a voltage controlled oscillator. The structure of this DRU 300 allows for bringing the complex calculations performed within the phase detector unit 320 outside of the feedback loop 380. The phase detector unit 320 operates by using the incoming data 330 and a reference phase input (PH REF) 335, not input from the oscillator 310 phase, as is done by the phase detector unit 120 of the DRU 100 of FIG. 2. Thus, the loop latency is reduced to a minimum and, as such, the DRU bandwidth is no longer limited by the loop latency.

In this figure, at least one clock signal (CLK) 305 is shown to be injected into the DRU 300. In addition, a reference phase (PH REF) 335 and the incoming data (e.g., input data) 330 are shown to be inputted into the phase detector unit 320. The reference phase 335 is selected to simplify the hardware, and is a fixed value. The input data 330 is from N wires 340. The phase detector unit 320 compares the reference phase 335 with the input data 330 to obtain phase errors. Then, the phase detector unit 320 determines the average of the phase errors (e.g., the biased phase error) 325. The processing time (PT) 370 is the amount of time required by the phase detector unit 320 to calculate the average phase errors 325.

A subtractor 345 is shown to subtract the output from the oscillator 310 (e.g., signal "C") from the average of the phase errors 325 to obtain an unbiased phase error (e.g., signal "A"). The unbiased phase error (e.g., signal "A") is shown to be inputted into a low pass filter (LPF) 350. The LPF 350 filters the unbiased phase error (e.g., signal "A"). The output of the LPF 350 (e.g., signal "D") is then inputted into the oscillator 310. In some cases, the LPF 350 may be a variable LPF.

As shown in the figure, the input data 330 is inputted into a delay unit (e.g., a digital data delay) 375. The delay unit 375 will delay the input data 330 by an amount of time equal to the PT 370. The output from the delay unit 375 and the output of the oscillator 310 are then inputted into a sample selector 360. The sample selector 360 outputs at least one output data signal (DATAOUT) 390 and at least one enable signal (ENABLE) 395, which indicates which portions of output data signal 390 are the recovered data.

It should be noted that the DRU 100 illustrated in FIG. 2 has a negative loop 180 that brings and automatically keeps the average of the phase errors close to zero. The average of the NT transitions that are close to zero will clearly be a value close to zero. Conversely, for the DRU 300 depicted in FIG. 3, the NT phase errors may not be close to zero because the phase detector unit 320 operates on a reference phase (PH REF) 335. As such, a simple average of the phase errors may not produce a correct result. To better understand this concept, refer to FIG. 4.

Figure 4:
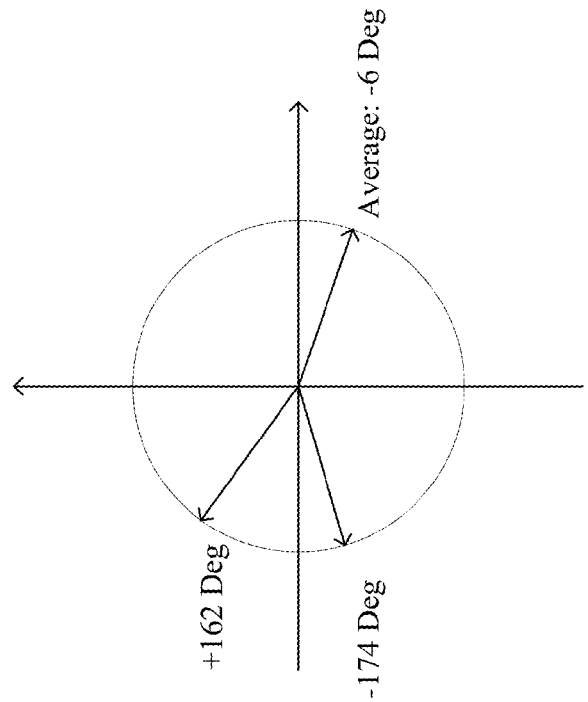
FIG. 4 contains two diagrams depicting two exemplary phase error cases (Case A and Case B).
Figure 4:
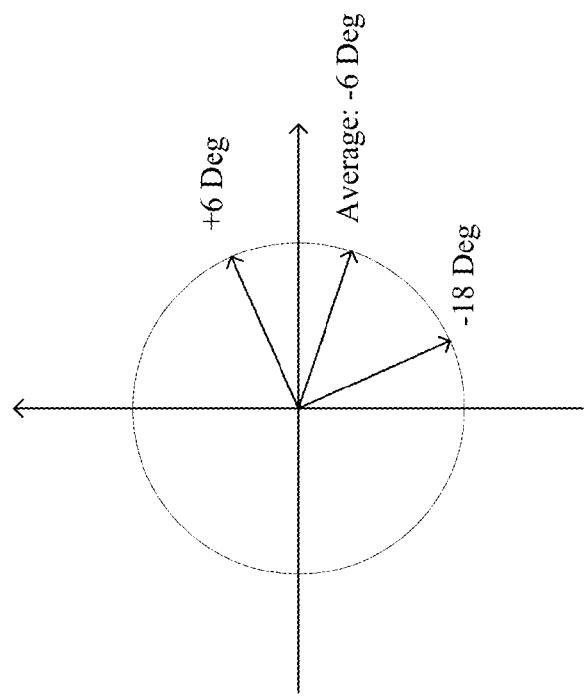

FIG. 4 contains two diagrams depicting two exemplary phase error cases (Case A and Case B). In Case A, two phase errors (in degrees), which are close to 0, need to be averaged. In this example, the two phase errors are −18 degrees and +6 degrees. The average of these two phase errors is −6 degrees. In this case, a simple average provides correct results. In Case B, the two phase errors are +162 degrees and −174 degrees. This means that both of the transitions are very close to having a 0.5 unit interval (UI) of phase error. The average between these two phase errors is −6 degrees, similar to Case A.

However, the average of –6 degrees for Case B which is clearly incorrect because the expected average should be a number that is close to the two phase errors of +162 degrees and –174 degrees.

Figure 5:
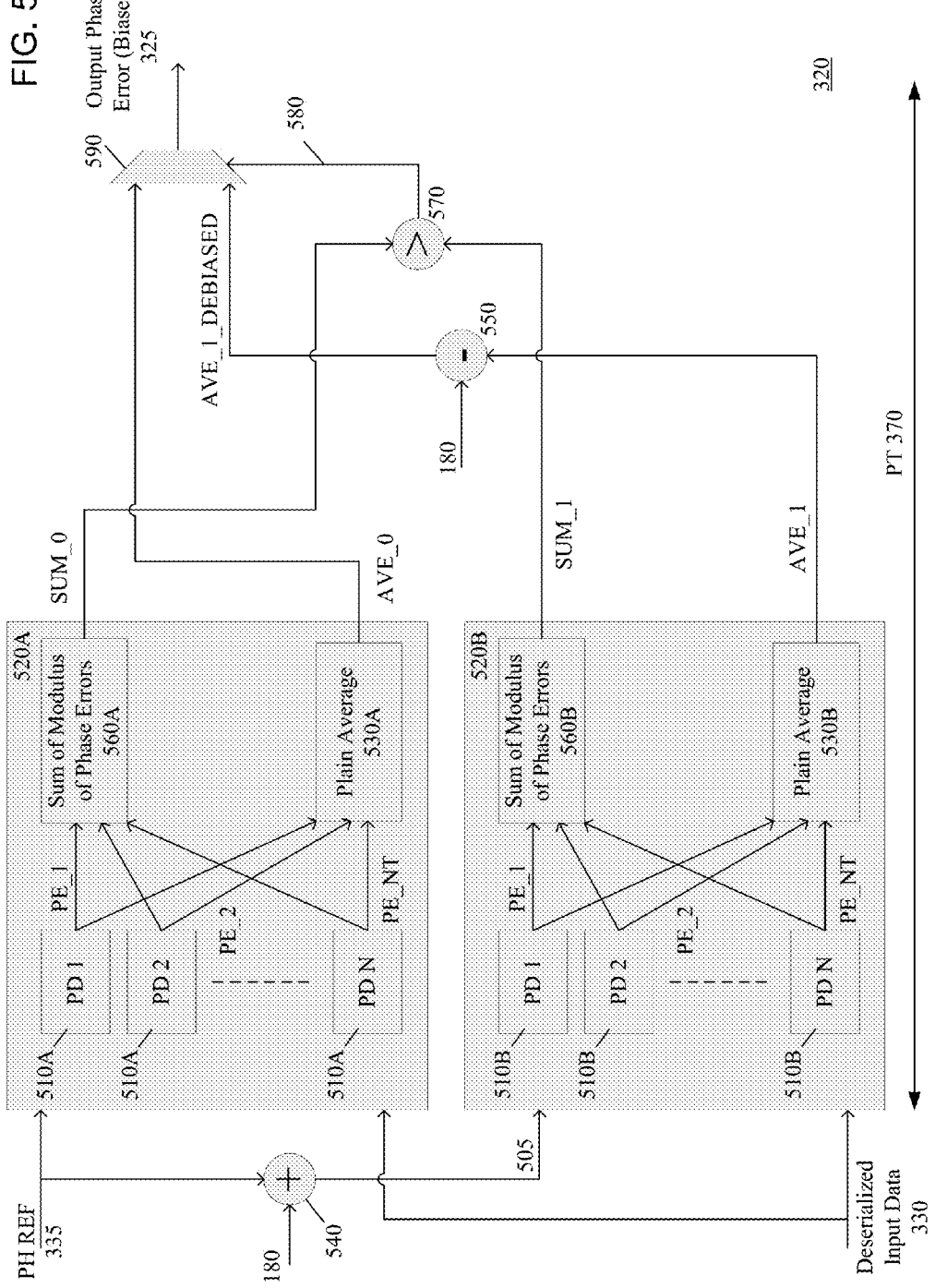
FIG. 5 is a schematic diagram illustrating an expanded view of the phase detector unit of the disclosed oversampling based DRU with zero-latency loop of FIG. 3.

FIG. 5 is a schematic diagram illustrating an expanded view of the phase detector unit 320 of the disclosed oversampling based DRU 300 with zero-latency loop of FIG. 3. The structure depicted in FIG. 5 is an implementation for the phase detector unit 320 that calculates the correct average for all possible input phase errors.

As shown in the figure, the phase detector unit 320 comprises a first phase detector subunit 520A and a second phase detector subunit 520B. The first phase detector subunit 520A and the second phase detector subunit 520B comprise N phase detectors 510A, 510B, respectively. During use, the reference phase 335 and the input data 330 are inputted into the first phase detector subunit 520A. The reference phase is shifted by +180 degrees (using the summer 540) to obtain a shifted reference phase 505. The shifted reference phase 505 and the input data 330 are inputted into the second phase detector subunit 520B.

At least some of the phase detectors 510A in the first phase detector subunit 520A compare the reference phase 335 with the input data 330 to obtain NT first phase detector subunit phase errors (e.g., PE_1 to PE_NT) for the first phase detector subunit 520A. Also, at least some of the phase detectors 510B in the second phase detector subunit 520B compare the shifted reference phase 505 with the input data 330 to obtain NT second phase detector subunit phase errors (e.g., PE_1 to PE_NT) for the second phase detector subunit 520B. In some cases, all of the phase detectors 510A in the subunit 520A, and all of the phase detectors 510B in the subunit 520B are used. In other cases, some but not all of the phase detectors 510A in the subunit 520A, and some but not all of the phase detectors 510B in the subunit 520B are used.

The first phase detector subunit 520A then determines the sum of the modulus 560A (e.g., SUM_0) of the first phase detector subunit phase errors, and the second phase detector subunit 520B then determines the sum of the modulus 560B (e.g., SUM_1) of the second phase detector subunit phase errors. Then, the first phase detector subunit 520A determines the average 530A (e.g., AVE_0) of the first phase detector subunit phase errors, and the second phase detector subunit 520B then determines the average 530B (e.g., AVE_1) of the second phase detector subunit phase errors. In some cases, the sum of the modulus 560A may be provided by a summer that is a part of the first phase detector subunit 520A, and the sum of the modulus 560B may be provided by a summer that is a part of the second phased detector subunit 520B. Also, in some cases, the average 530A may be provided by an averaging unit that is a part of the first phase detector subunit 520A, and the average 530B may be provided by an averaging unit that is a part of the second phase detector subunit 520B.

The sum of the modulus 520A (e.g., SUM_0) of the first phase detector subunit phase errors and the sum of the modulus 520B (e.g., SUM_1) of the second phase detector subunit phase errors are inputted into a selector 570. The selector 570 outputs a selector signal 580, which is based on the sum of the modulus 520A (e.g., SUM_0) and the sum of the modulus 520B (e.g., SUM_1).

The average 530B (e.g., AVE_1) of the second phase detector subunit phase errors is shifted by a subtractor 550 by –180 degrees to produces a debiased signal (e.g., AVE_1_DEBIASED). The average 530A (e.g., AVE_0) of the first phase detector subunit phase errors, the average of the second phase detector subunit phase errors shifted by –180 degrees (e.g., AVE_1_DEBIASED), and the selector signal 580 are inputted into a multiplexer 590. The multiplexer 590 outputs the average of the phase errors 325. The average of the phase errors 325 outputted by the multiplexer 590 is either the average (e.g., AVE_0) of the first phase detector subunit phase errors, or the average (e.g., AVE_1) of the second phase detector subunit phase errors, whichever one that is associated with a smaller sum of the modulus.

With a given reference phase (PH REF) 335, the plain average phase errors 530A, 530B are calculated between the incoming data 330 with two respective different input phases: the reference phase 335 and the shifted reference phase 505 (which is the reference phase 335 shifted by a summer 540 by +180 degrees (e.g., PH REF+180 degrees). The second phase error 530B will be de-biased by the subtractor 550 subtracting 180 degrees from the result. In most of the cases, the two calculated averages 530A, 530B will be the same. However, there are cases when the output average is completely different, and only one of the two is correct and is selected.

To better understand how the phase detector unit 320 will always calculate the correct average of the phase errors 325, numerical examples are presented. For example, assuming phase detector 510A (e.g., PD_1) in subunit 520A detects PE_1=162 degrees and the other phase detector 510A (e.g., PD_2) in subunit 520A detects PE_2=–174 degrees. In some cases, the subunit 520A may have only two phase detectors (e.g., PD_1, PD_2) 510A that detect the two phases in this example. In other cases, the subunit 520A may have more than two phase detectors 510A, in which case, some (e.g., two) but not all of the phase detectors 510A are used to detect the two phases in this example.

In this example, AVE_0 will be calculated to be –6 degrees (=(162–174)/2). AVE_1 will also be calculated to be –6 degrees. In particular, subunit 520B works on the same data and a phase that is shifted by 180 degrees. So the two phases worked on by the subunit 520B are: 342 degrees (162+180=342) and 6 degrees (–174+180=6). Note that for the purpose of the averaging calculation, the phases are valid between –180 and +180 degrees. So the above 342 degrees "wraps" around and becomes –18 degrees. Accordingly, the average of –18 degrees and 6 degrees is –6 degrees. The AVE_1 value of –6 degrees is debiased by –180 degrees by the subtractor 550. As such, AVE_1_DEBIASED will be calculated to be –6–180=–186. Again, because the phases are valid between –180 and +180 degrees, the –186 degrees "wraps" around and becomes 174 degrees.

Following the above example, the subunits 520A, 520B also work on the phases to determine the sums of the modulus SUM_0, SUM_1. For the purpose of such calculation, the absolute values of the phases are used. Accordingly, SUM_0 will be calculated to be 336 degrees (i.e. 174+162=336 degrees), while SUM_1 will be calculated to be 24 degrees (i.e. 6+18=24 degrees). Note that these outputs do not "wrap" around the "–180 to 180" scale, and therefore, they are inputted as-is into the selector 570. Since SUM_1 is less than SUM_0, the selector 570 will select SUM_1 and will generate a selector signal 580 that is associated with SUM_1 (the smaller value of SUM_0 and SUM_1). The multiplexer 590 receives (1) the selector signal 580 (which corresponds with SUM_1 in the example) from the selector 570, (2) AVE_0, which is –6 degrees in the example, and (3) AVE_1_DEBIASED, which is –186 degrees in the example. The multiplexer 590 then outputs either the AVE_0 value or the AVE_1_DEBIASED value, whichever one with which the selector signal 580 is associated. In the illustrated example, the selector signal 580 is associated with SUM_1, and therefore, the multiplexer 590 will output AVE_1 (with the corresponding smaller sum of the modulus SUM_1) based on the selector signal 580.

It should be noted that at each clock cycle, only one calculated phase error average (e.g., AVE_0 or AVE_1) will be selected. The selected phase error average (e.g., AVE_0 or AVE_1) will be the one calculated from the phase errors that have the lower sum of the modulus 520A, 520B. This guarantees that the correct phase error average will always be selected.

Figure 6:
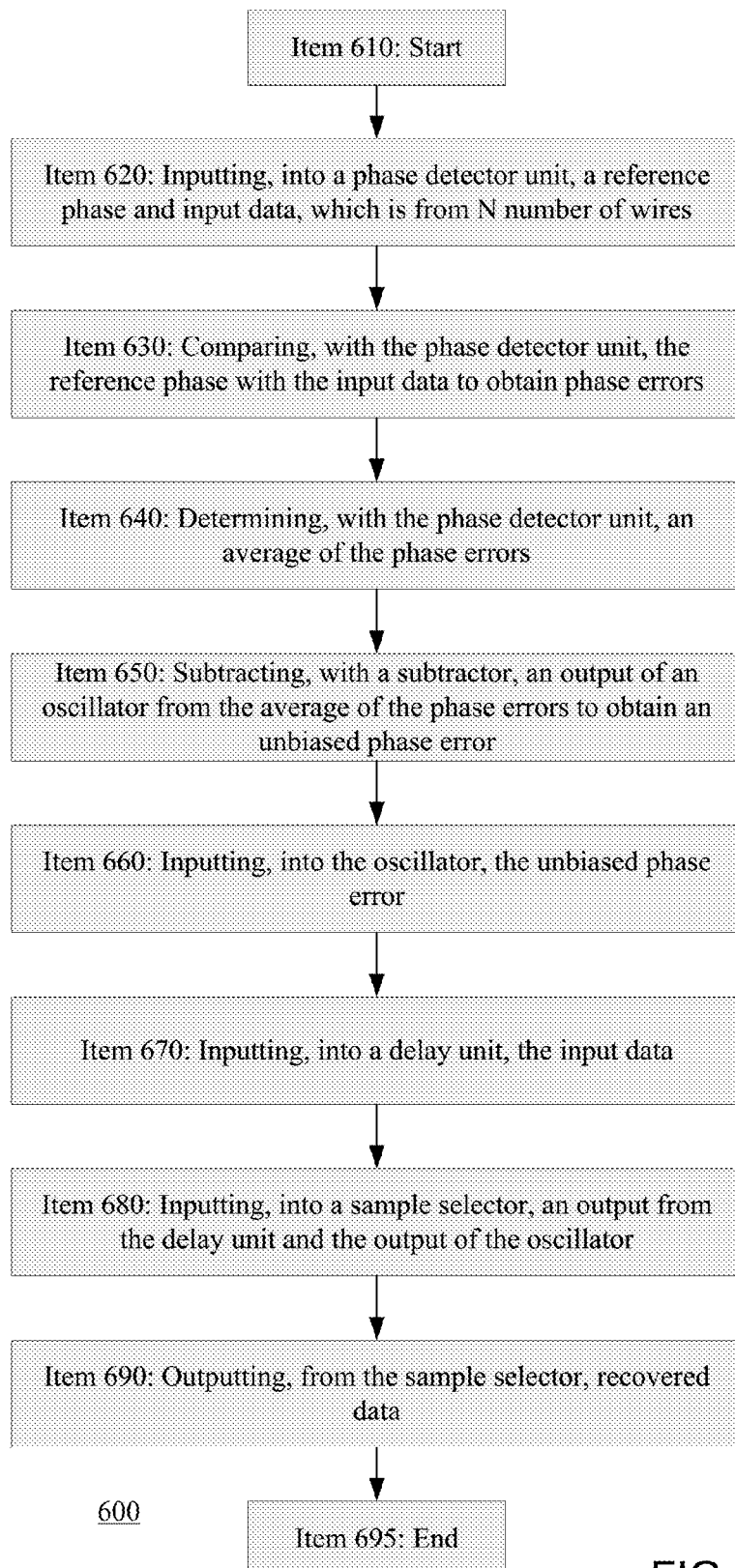
FIG. 6 is flow chart showing the disclosed method for operation of the disclosed oversampling based DRU with zero-latency loop of FIG. 3.

FIG. 6 is flow chart showing the disclosed method 600 for operation of the disclosed oversampling based DRU 300 with zero-latency loop of FIG. 3. At the start 610 of the method 600, a reference phase and input data, which is from N wires, are inputted into a phase detector unit (item 620). The phase detector unit may be the phase detector unit 320 of FIG. 3 in one example. The phase detector unit then compares the reference phase with the input data to obtain phase errors (item 630). Then, the phase detector unit determines the average of the phase errors (item 640).

A subtractor then subtracts the output from an oscillator (e.g., the oscillator 310 of FIG. 3) from the average of the phase errors to obtain an unbiased phase error (item 650). Then, the unbiased phase error is inputted into the oscillator (item 660). Optionally, the unbiased phase error may be inputted into the oscillator through a LPF (such as the LPF 350 of FIG. 3). In addition, the input data is inputted into a delay unit (item 670), such as the delay unit 375 of FIG. 3. Then, an output from the delay unit and the output of the oscillator are inputted into a sample selector (item 680), such as the sample selector 360 of FIG. 3. The sample selector then outputs the recovered data 690. Then, the method 600 ends at item 695.

Where methods described above indicate certain events occurring in certain order, those of ordinary skill in the art having the benefit of this disclosure would recognize that the ordering may be modified and that such modifications are in accordance with the variations of the claimed invention. Additionally, parts of methods may be performed concurrently in a parallel process when possible, or may alternatively be performed sequentially. In addition, more parts or less part of the methods may be performed.

Although particular examples have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover alternatives, modifications, and equivalents.

What is claimed is:

1. A data recovery unit (DRU), comprising:
an oscillator;
a phase detector unit configured to receive a reference phase and to receive input data through N wires, where N is an integer greater than 1, to compare the reference phase with the input data to obtain phase errors, and to determine an average of the phase errors;
a subtractor to subtract an output of the oscillator from the average of the phase errors to obtain an unbiased phase error;
a delay unit to receive the input data; and
a sample selector configured to receive an output from the delay unit and the output of the oscillator, and to output recovered data.

2. The DRU of claim 1, further comprising a low pass filter to filter the unbiased phase error, and to input the filtered unbiased phase error into the oscillator.

3. The DRU of claim 2, wherein the low pass filter is a variable low pass filter.

4. The DRU of claim 1, wherein the phase detector unit comprises a first phase detector subunit and a second phase detector subunit.

5. The DRU of claim 4, wherein the first phase detector subunit comprises N phase detectors, and the second phase detector subunit comprises N phase detectors.

6. The DRU of claim 5, wherein the first phase detector subunit is configured to receive the reference phase and the input data; and
wherein the second phase detector subunit is configured to receive the reference phase shifted by +180 degrees and the input data.

7. The DRU of claim 6, wherein:
at least some of the phase detectors in the first phase detector subunit are configured to compare the reference phase with the input data to obtain NT first phase detector subunit phase errors, where NT is an integer; and
at least some of the phase detectors in the second phase detector subunit are configured to compare the reference phase shifted by +180 degrees with the input data to obtain NT second phase detector subunit phase errors.

8. The DRU of claim 7, wherein:
the first phase detector subunit is configured to determine a sum of a modulus of the first phase detector subunit phase errors; and
the second phase detector subunit is configured to determine a sum of a modulus of the second phase detector subunit phase errors.

9. The DRU of claim 8, wherein:
the first phase detector subunit is configured to determine an average of the first phase detector subunit phase errors; and
the second phase detector subunit is configured to determine an average of the second phase detector subunit phase errors.

10. The DRU of claim 9, wherein the phase detector unit further comprises a selector configured to receive the sum of the modulus of the first phase detector subunit phase errors and the sum of the modulus of the second phase detector subunit phase errors, and to output a selector signal.

11. The DRU of claim 10, wherein:
the phase detector unit further comprises a multiplexer configured to receive the average of the first phase detector subunit phase errors, the average of the second phase detector subunit phase errors shifted by −180 degrees, and the selector signal; and
the multiplexer is further configured to output either the average of the first phase detector subunit phase errors or the average of the second phase detector subunit phase errors, that is associated with a smaller sum of the modulus as the average of the phase errors.

12. A method performed by a data recovery unit (DRU), the method comprising:
receiving, by a phase detector unit, a reference phase and input data, wherein the input data is received by the phase detector unit through N wires, where N is an integer greater than 1;
comparing, using the phase detector unit, the reference phase with the input data to obtain phase errors;
determining, using the phase detector unit, an average of the phase errors;

subtracting, with a subtractor in the phase detector unit, an output of an oscillator from the average of the phase errors to obtain an unbiased phase error;

receiving, by a delay unit in the phase detector unit, the input data;

inputting, into a sample selector in the phase detector unit, an output from the delay unit and the output of the oscillator; and outputting, from the sample selector, recovered data.

13. The method of claim 12, further comprising:

filtering, with a low pass filter, the unbiased phase error; and inputting the filtered unbiased phase error into the oscillator.

14. The method of claim 12, wherein the phase detector unit comprises:

a first phase detector subunit; and a second phase detector subunit:

wherein the first phase detector subunit comprises N phase detectors and the second phase detector subunit comprises N phase detectors.

15. The method of claim 14, wherein the act of receiving comprises:

receiving, by the first phase detector subunit, the reference phase and the input data; and receiving, by the second phase detector subunit, the reference phase shifted by +180 degrees and the input data.

16. The method of claim 15, wherein the act of comparing comprises:

comparing, using at least some of the phase detectors in the first phase detector subunit, the reference phase with the input data to obtain NT first phase detector subunit phase errors, where NT is an integer; and comparing, using at least some of the phase detectors in the second phase detector subunit, the reference phase shifted by +180 degrees with the input data to obtain NT second phase detector subunit phase errors.

17. The method of claim 16, further comprising:

determining, with the first phase detector subunit, a sum of a modulus of the first phase detector subunit phase errors; and determining, with the second phase detector subunit, a sum of a modulus of the second phase detector subunit phase errors.

18. The method of claim 17, further comprising:

determining, with the first phase detector subunit, an average of the first phase detector subunit phase errors; and determining, with the second phase detector subunit, an average of the second phase detector subunit phase errors.

19. The method of claim 18, further comprising:

inputting, into a selector, the sum of the modulus of the first phase detector subunit phase errors and the sum of the modulus of the second phase detector subunit phase errors; and outputting, from the selector, a selector signal.

20. The method of claim 19, further comprising:

inputting, into a multiplexer, the average of the first phase detector subunit phase errors, the average of the second phase detector subunit phase errors shifted by −180 degrees, and the selector signal; and outputting, from the multiplexer, either the average of the first phase detector subunit phase errors or the average of the second phase detector subunit phase errors, that is associated with a smaller sum of the modulus as the average of the phase errors.

* * * * *